United States Patent
Jiang (10) Patent No.: US 12,487,629 B2
(45) Date of Patent: Dec. 2, 2025

(54) CLOCK DOUBLER WITH CORRECTION FOR OUTPUT CLOCK CYCLE AND CLOCK DUTY CYCLE

(71) Applicant: Analog Devices, Inc., Wilmington, MA (US)

(72) Inventor: Xuesong Jiang, Princeton, NJ (US)

(73) Assignee: Analog Devices, Inc., Wilmington, MA (US)

( * ) Notice: Subject to any disclaimer, the term of this patent is extended or adjusted under 35 U.S.C. 154(b) by 154 days.

(21) Appl. No.: 18/475,875

(22) Filed: Sep. 27, 2023

(65) Prior Publication Data
US 2024/0111326 A1   Apr. 4, 2024

Related U.S. Application Data

(60) Provisional application No. 63/412,915, filed on Oct. 4, 2022.

(51) Int. Cl.
*G06F 1/08* (2006.01)
*G06F 1/14* (2006.01)

(52) U.S. Cl.
CPC .   *G06F 1/08* (2013.01); *G06F 1/14* (2013.01)

(58) Field of Classification Search
CPC ..................... G06F 1/12; G06F 1/08
See application file for complete search history.

(56) References Cited

U.S. PATENT DOCUMENTS

| | | | | |
|---|---|---|---|---|
| 4,623,846 A * | 11/1986 | LaMacchia | ............ | H03K 21/10 327/172 |
| 5,097,490 A * | 3/1992 | Hulsing, II | ............ | G01R 23/10 377/28 |
| 6,731,708 B1 * | 5/2004 | Watanabe | ................ | H03K 5/19 327/295 |
| 6,906,562 B1 * | 6/2005 | Nguyen | ..................... | G06F 7/68 327/116 |
| 7,236,557 B1 * | 6/2007 | Nguyen | ............... | H03K 23/425 327/116 |
| 11,387,813 B2 | 7/2022 | Ting et al. | | |
| 2004/0196086 A1 * | 10/2004 | Ishimi | .................. | H03L 7/0995 327/291 |
| 2007/0019770 A1 * | 1/2007 | Bradley | .................... | H03L 1/00 375/360 |
| 2012/0242314 A1 * | 9/2012 | Namekawa | .............. | H03K 7/08 323/283 |
| 2021/0351779 A1 | 11/2021 | Shen et al. | | |
| 2021/0409007 A1 | 12/2021 | Moslehi et al. | | |
| 2022/0069809 A1 * | 3/2022 | Ting | ....................... | H03K 3/017 |

FOREIGN PATENT DOCUMENTS

| | | |
|---|---|---|
| CN | 112073062 A | 12/2020 |
| TW | 202201176 A | 1/2022 |

OTHER PUBLICATIONS

International Search Report and Written Opinion in PCT/US2023/075382, mailed Mar. 1, 2024, 11 pages.

* cited by examiner

*Primary Examiner* — Phil K Nguyen
(74) *Attorney, Agent, or Firm* — ArentFox Schiff LLP (57) ABSTRACT

A synthesizable clock doubler is disclosed. The clock doubler is implemented using unique combination of logic cells from a standard cell library. At the core of the clock doubler is a high-frequency ring oscillator that generates timing information for clock measurements. Replica ring oscillators are used to generate programmable delays for the correction of the output clock imperfection, such as cycle-to-cycle variation and duty cycle of the doubled clock.

20 Claims, 8 Drawing Sheets

CLOCK DOUBLER WITH CORRECTION FOR OUTPUT CLOCK CYCLE AND CLOCK DUTY CYCLE

CROSS-REFERENCE TO RELATED APPLICATION(S)

This application claims the benefit of U.S. Provisional Patent Application No. 63/412,915, entitled "CLOCK DOUBLER WITH CORRECTION FOR OUTPUT CLOCK CYCLE AND CLOCK DUTY CYCLE" and filed on Oct. 4, 2022, which is expressly incorporated by reference herein in its entirety.

TECHNICAL FIELD OF THE DISCLOSURE

The present disclosure generally relates to electronic devices and systems and, more particularly, to circuits for generating clock signals for electronic components.

BACKGROUND

In electronic instrumentation and signal processing, clocks are circuits that generate clock signals for timing operations of electronic components such as analog-to-digital converters (ADCs), digital-to-analog converters (DACs), and many more. Clocks are used in many different applications, such as automotive, communications, aerospace, defense, etc.

A variety of factors can affect the cost, quality and robustness of a clock. Physical constraints such as space/surface area can pose further constraints to the clock requirements or specifications, and thus trade-off and ingenuity have to be exercised in designing a clock that is optimal for a given application.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a clock doubler may include a calibration circuit including a ring oscillator and a first counter. The ring oscillator may be configured to identify timing information for clock measurement associated with an output clock frequency. The first counter may be configured to output the timing information for calibration of a clock providing an input clock frequency. The clock doubler may further include a delay circuit including a replica ring oscillator and a second counter. The replica ring oscillator may be configured to determine a delay value for correction of the input clock frequency based on a defined delay value. The second counter may be configured to output the delay value for correction of the output clock frequency having a clock frequency that is a multiple of the input clock frequency.

According to another example, a method of clock cycle correction may include identifying, via a ring oscillator, timing information for clock measurement associated with an output clock frequency. The method may further include outputting, via a first counter, the timing information for calibration of a clock providing an input clock frequency. The method may further include determining, via a replica ring oscillator, a delay value for correction of the input clock frequency based on a defined delay value. The method may further include outputting, via the second counter, the delay value for correction of the output clock frequency having a clock frequency that is a multiple of the input clock frequency.

According to an additional example, a clock doubler may include means for identify timing information for clock measurement associated with an output clock frequency. The clock doubler may further include means for outputting the timing information for calibration of a clock providing an input clock frequency. The clock doubler may further include means for determining a delay value for correction of the input clock frequency based on a defined delay value. The clock doubler may additionally include means for outputting the delay value for correction of the output clock frequency having a clock frequency that is a multiple of the input clock frequency.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

The systems, methods and devices of this disclosure each have several innovative aspects, no single one of which is solely responsible for all of the desirable attributes disclosed herein. Details of one or more implementations of the subject matter described in the present disclosure are set forth in the description below and the accompanying drawings.

A synthesizable clock doubler is disclosed. The clock doubler is implemented using unique combination of logic cells from a standard cell library. At the core of the clock doubler is a high-frequency ring oscillator that generates timing information for clock measurements. Replica ring oscillators are used to generate programmable delays for the correction of the output clock imperfection, such as cycle-to-cycle variation and duty cycle of the doubled clock.

As will be appreciated by one skilled in the art, aspects of the present disclosure, in particular aspects of clock doublers proposed herein, may be embodied in various manners—e.g., as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g., to the existing ADCs, DACs, other electronic components, digital signal processing (DSP) cores, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the select examples.

In the following description, reference is made to the drawings, where like reference numerals can indicate identical or functionally similar elements. It will be understood that elements illustrated in the drawings are not necessarily drawn to scale. Moreover, some embodiments can incorporate any suitable combination of features from two or more drawings. Further, it will be understood that certain embodiments can include more elements than illustrated in a drawing and/or a subset of the elements illustrated in a drawing. In general, while some drawings provided herein illustrate various aspects of clock doublers, and systems in which such circuits may be implemented, details of these systems may be different in different embodiments. For example, various components of clock doublers, presented herein, may have further components included therein, or coupled thereto, which are not specifically shown in the drawings, such as logic, storage, passive elements (e.g., resistors), or other elements. In another example, details shown in some of the drawings, such as the particular arrangement and example implementation details of various components of clock doublers presented herein (e.g., a duty cycle correction circuit, a delay circuit, etc.), the particular arrangement of coupling connections between the outputs of various stages of a clock doubler and logic elements of a clock doubler, etc., may be different in different embodiments, with the illustrations of the present drawings providing only some examples of how these components may be used together to realize clock doublers with relatively low area and power consumption. In yet another example, although some embodiments shown in the present drawings illustrate a certain number of components (e.g., a certain number of delay circuits), it is understood that these embodiments may be implemented in a clock doubler or in any other devices or systems with any number of these components in accordance with the descriptions provided herein. Furthermore, although certain elements such as various elements of a clock doubler may be depicted in the drawings as communicatively coupled using a single depicted line, in some embodiments, any of these elements may be coupled by a plurality of conductive lines such as those that may be present in a bus, or when differential signals are involved.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect electrical connection through one or more passive or active intermediary devices/components. In another example, the terms "circuit" or "circuitry" (which may be used interchangeably) refer to one or more passive and/or active components that are arranged to cooperate with one another to provide a desired function. Sometimes, in the present descriptions, the term "circuit" may be omitted (e.g., a clock doubler circuit may be referred to simply as a "clock doubler," etc.). If used, the terms "substantially," "approximately," "about," etc., may be used to generally refer to being within +/−10% of a target value, e.g., within +/−5% of a target value or within +/−2% of a target value, based on the context of a particular value as described herein or as known in the art.

Figure 1:
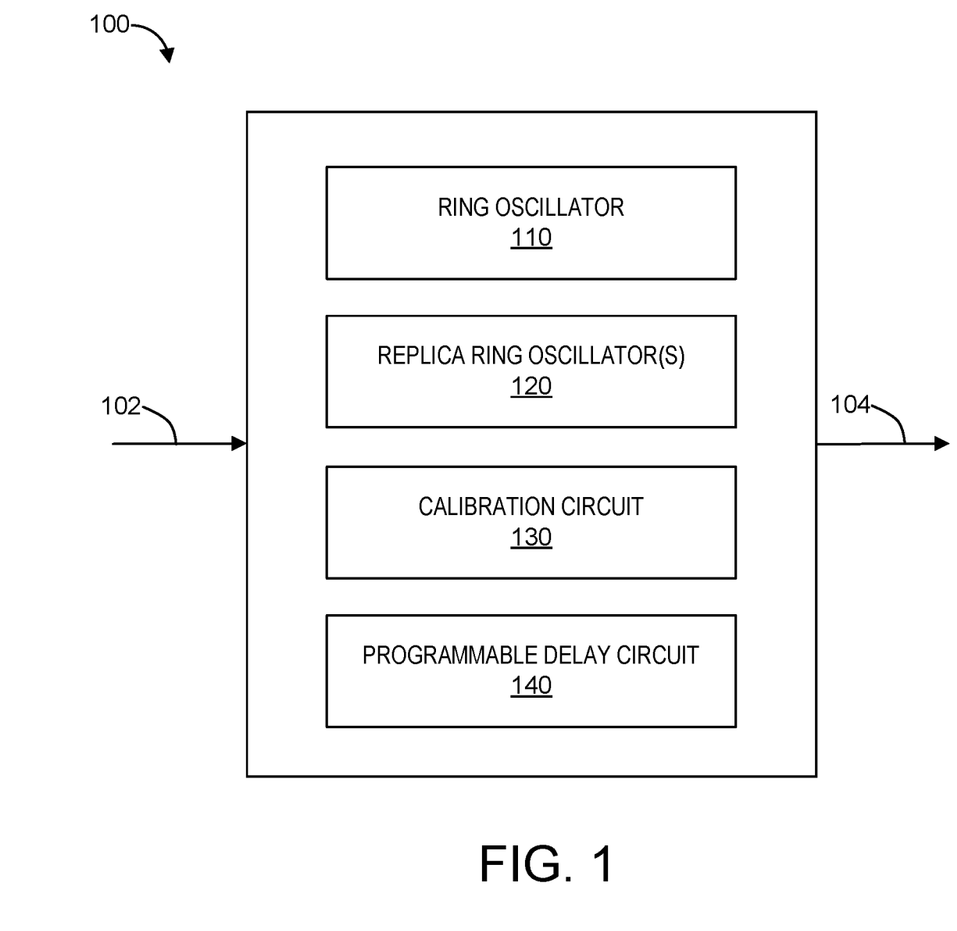
FIG. 1 provides a block diagram of a clock doubler, according to some embodiments of the present disclosure.

FIG. 1 provides a block diagram of a clock doubler 100, according to some embodiments of the present disclosure. As shown, the clock doubler 100 may be configured to receive an input clock signal 102 (or, simply, an "input clock") and output an output clock signal 104 (or, simply, an "output clock") that is a doubled clock signal compared to the input clock signal 102 (i.e., the output clock signal 104 is a clock signal having a frequency that is substantially doubled compared to the frequency of the input clock signal 102). As further shown in FIG. 1, the clock doubler 100 may include a ring oscillator 110 and one or more replica ring oscillators 120. The ring oscillator 110 may be configured to generate timing information for clock measurements. In some embodiments, the ring oscillator 110 may be a high-frequency ring oscillator. Replica ring oscillators 120 may be configured to generate programmable delays for the correction of the output clock imperfection, such as cycle-to-cycle variation and duty cycle of the doubled clock generated by the clock doubler 100. FIG. 1 further illustrates that, in some embodiments, the clock doubler 100 may further include a calibration circuit 130 and/or a programmable delay circuit 140.

The clock doubler 100 may be a clock that is relatively simple to implement without analog components such as resistors and capacitors and without using analog blocks such as a comparator. The clock doubler 100 may be implemented using logic cells from the standard cell library only and, thus, may be fully synthesizable and can be easily reused in various technologies. For example, in some implementations, the output clock signal 104 of the clock doubler 100 may be used directly to clock operation of one or more ADCs and/or one or more DACs.

Typically, phase noise, clock cycle-to-cycle variation and clock duty cycle of the doubled clock are major areas of concerns. In the clock doubler 100, the ring oscillator 110 may be a high-frequency free-running ring oscillator, used to generate timing information for clock measurement and correction. The absolute error post clock calibration and correction may be limited by the clock period of the ring oscillator 110. The relative error may be smaller when the ratio of the ring oscillator frequency to the doubled clock frequency is larger. Clock period and duty cycle may be characterized by counting number of ring oscillator clock cycles. The engine of clock characterization may have six modes of operation: input clock period measurement, input clock duty cycle measurement, double clock period and duty cycle measurements with the clock aligned with logic HIGH region of the input clock, and double clock period and duty cycle measurements with the clock aligned with logic LOW region of the input clock. The input clock duty cycle measurement result and doubled clock period measurement results may be used for input clock duty cycle correction. The input clock duty cycle correction may be done with a single delay chain that can act either on clock rising edge or falling edge in order to correct duty cycle errors above or below the target (e.g., a 50% target). Replica ring oscillators 120 and counters may be used to generate timing information that ensures the doubled clock has near-50% duty cycle. Together, a ring oscillator 110 and a counter may be considered as a programmable wrapped-around delay line that has potential to generate long delays with only a few logic gates.

Figure 2:
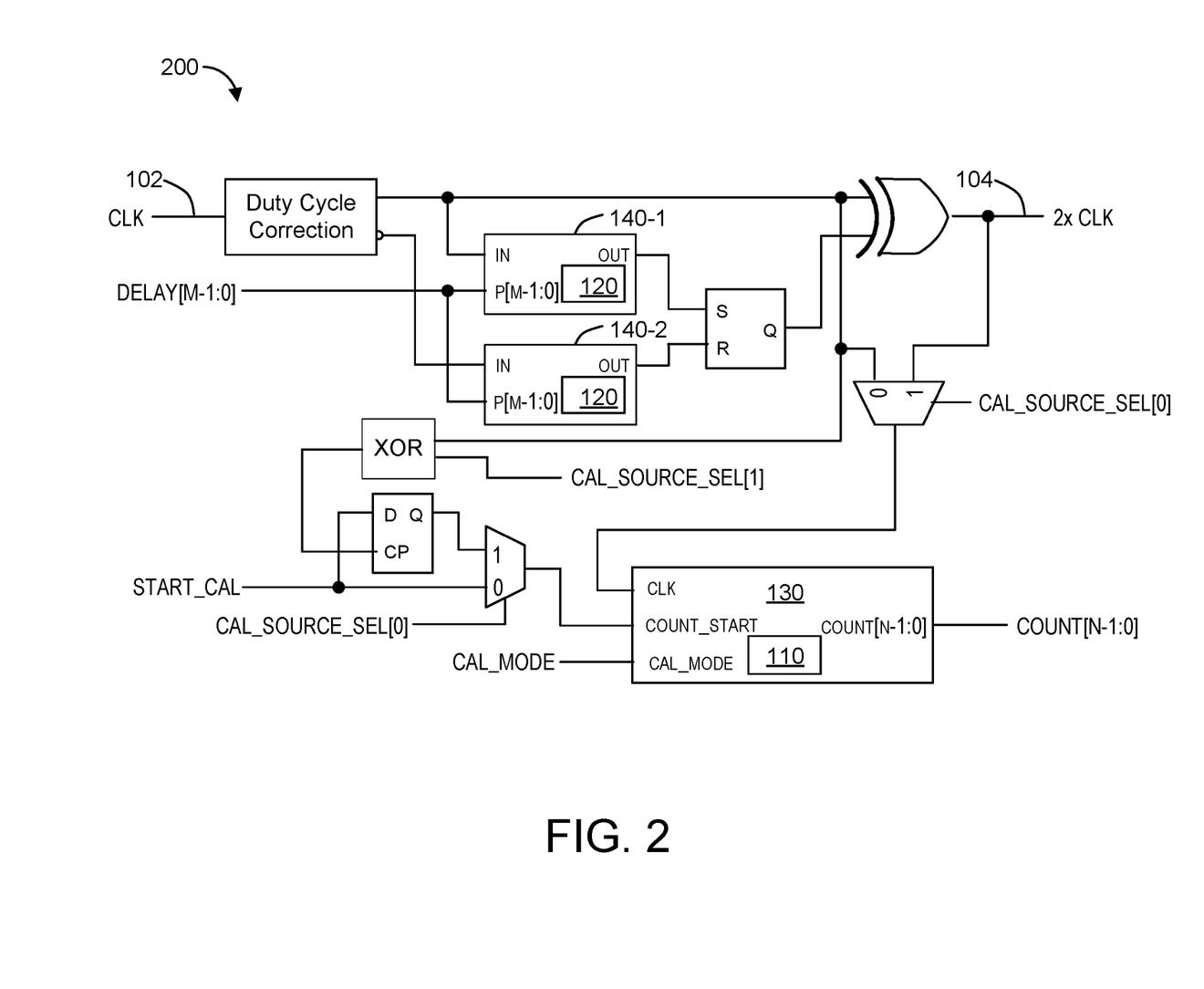
FIG. 2 provides an illustration of an example clock doubler, according to some embodiments of the present disclosure.

FIG. 2 provides an illustration of an example clock doubler 200, according to some embodiments of the present disclosure. The clock doubler 200 may be an example of the clock doubler 100 of FIG. 1. To that end, some components of the clock doubler 100 are shown in the clock doubler 200. In particular, as shown in FIG. 2, the clock doubler 200 may include the calibration circuit 130 that includes the ring oscillator 110, and may further include two programmable delay circuits 140 (labeled in FIG. 2 as a first delay circuit 140-1 and a second delay circuit 140-2), each of which may include a respective replica ring oscillator 120. Although not specifically shown in FIG. 2, a respective counter is included in each of the calibration circuit 130 and programmable delay circuits 140.

There are many ways to implement a clock doubler, such as XOR of the input clock with a delayed version of the input clock, using a delay locked loop, using resistor-capacitor (RC) time constant to generate the required timing information and etc. The clock doubler 200 is a novel extension to the XOR-based clock doubler with a built-in time reference and clock measurement and correction circuits to generate a near-perfect clock at twice the input clock frequency. The resulting clock doubler may consume relatively low power, have good phase noise performance, and be fully synthesizable and easily reusable in newer technologies. Free-running ring oscillator with synchronous start control and a counter is an efficient way to generate programmable long delays. The ring oscillator may also provide an input clock independent time reference that is used for clock measurement and correction. Overall, the clock doubler 200 is a simpler all-digital design that is suitable for software-defined radio.

The clock doubler 200 may have a wide input range for frequencies of the input clock signal 102, e.g., from about 10 megahertz (MHz) to about 80 MHz. The clock doubler 200 may be synthesizable, and all standard cell implementation with calibration for doubled clock cycle-to-cycle variation and duty cycle. The clock doubler 200 may use a free-running ring oscillator as a time reference for calibration and two replica ring oscillators 120 for long clock delay generation. The clock doubler 200 may implement process-voltage-temperature (PVT) tracking of multiple ring oscillators. Calibration of the clock doubler 200 may be done in background without impacting the clock path. The clock doubler 200 may implement substantially glitch-free clock non-ideality correction.

Figure 3:
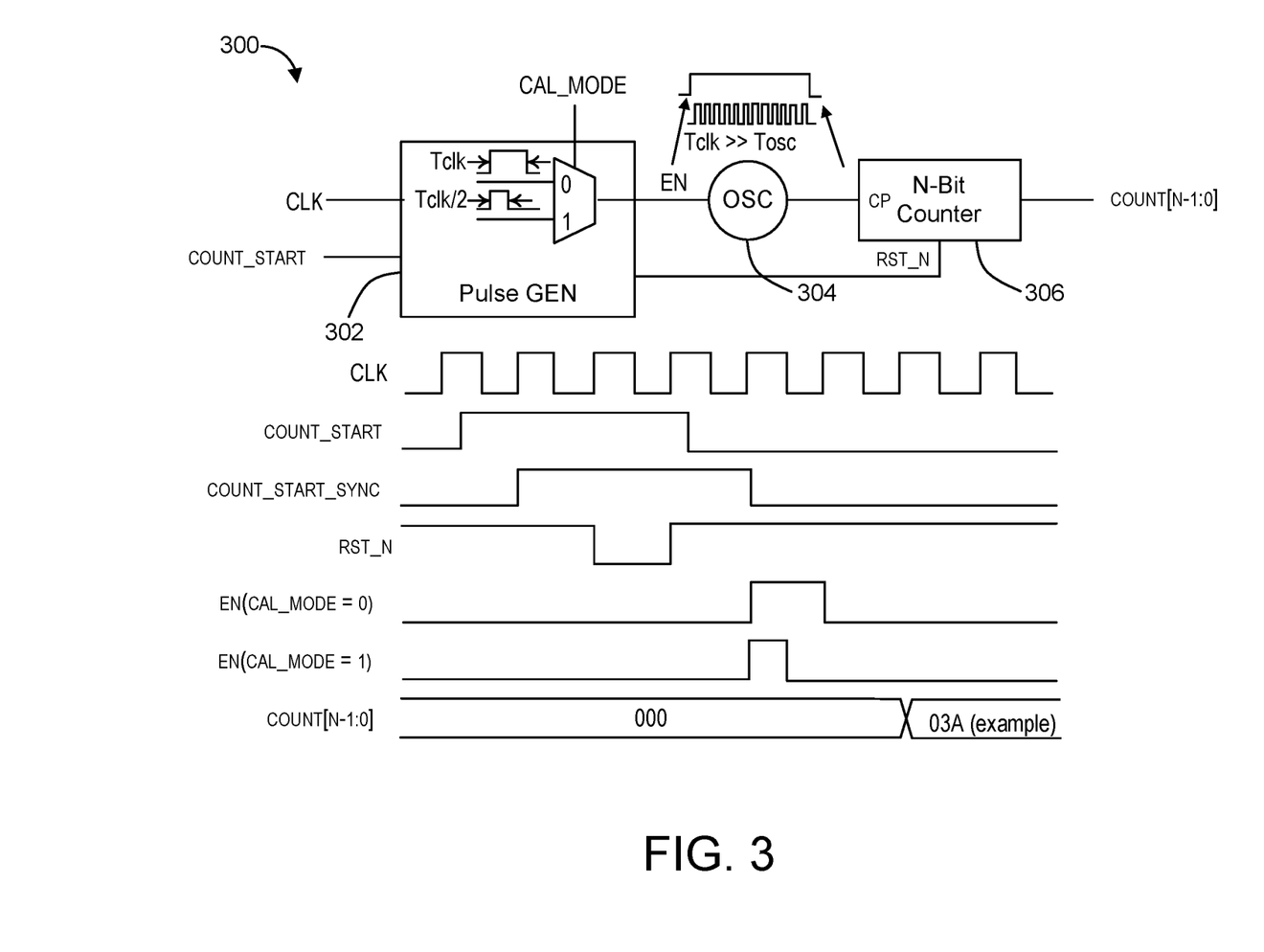
FIG. 3 provides an illustration of an example calibration circuit for a clock doubler, according to some embodiments of the present disclosure.

FIG. 3 provides an illustration of an example calibration circuit 300 for a clock doubler (i.e., clock doubler 100 and 200), according to some embodiments of the present disclosure. The calibration circuit 300 may be an example of the calibration circuit 130 of FIG. 1.

The calibration circuit 300 may include a pulse generator 302 configured to receive a clock and count start signals, and output pulses to a ring oscillator 304 and counter 306. The ring oscillator 304 and counter 306 may be configured to provide clock period and clock pulse width measurements. Clock period and clock pulse width may be measured as number of ring oscillator clock cycles. The measurement results based on the reference ring oscillator may be applied to generate programmable delays with the delay circuit based on the replica ring oscillators.

Figure 4:
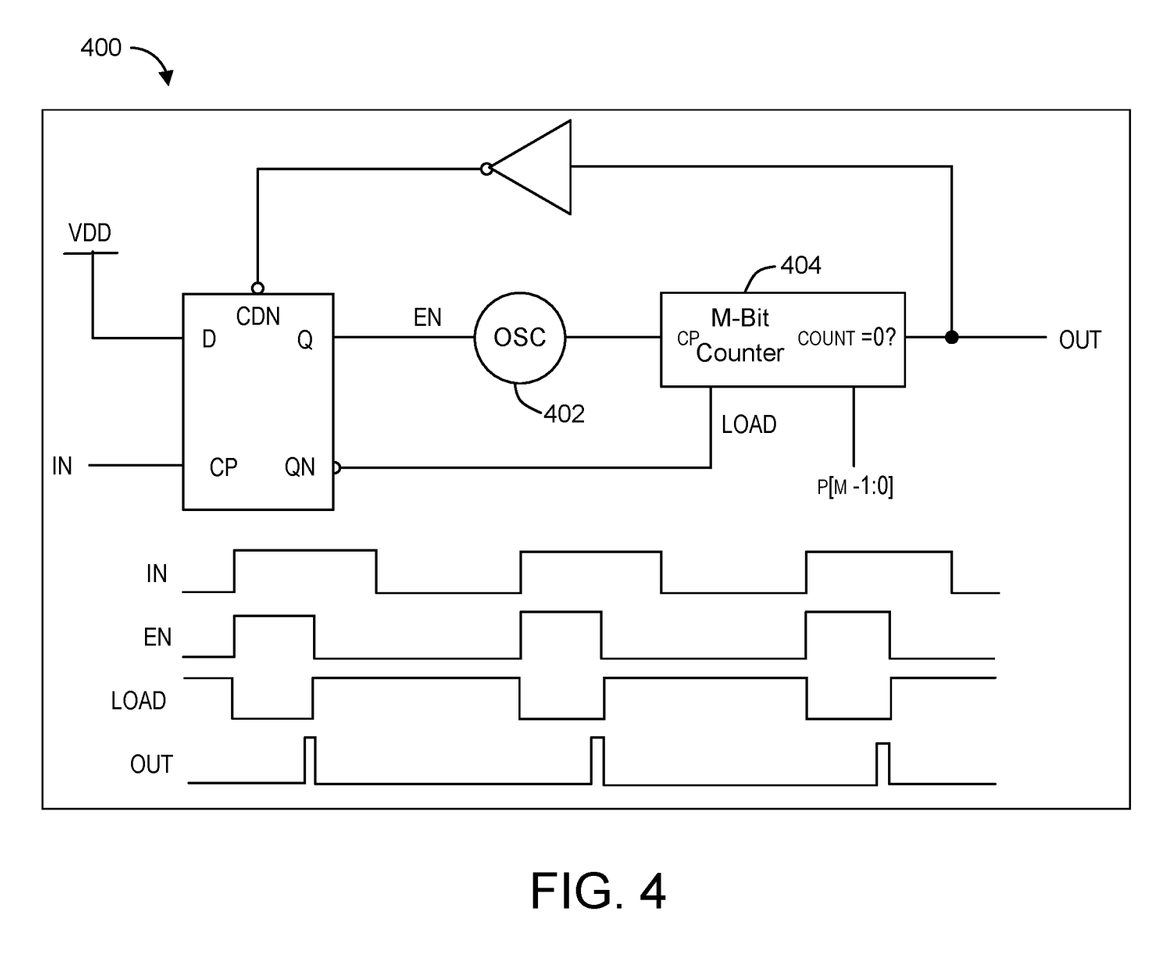
FIG. 4 provides an illustration of an example programmable delay circuit for a clock doubler, according to some embodiments of the present disclosure.

FIG. 4 provides an illustration of an example programmable delay circuit 400 for a clock doubler (i.e., clock doubler 100 and 200), according to some embodiments of the present disclosure. The delay circuit 400 may be an example of the delay circuit 140 of FIG. 1.

The delay circuit 400 may include a ring oscillator 402 and counter 404 based programmable delay circuit. When oscillator 402 starts, the counter 404 may start at a value set by P[M−1:0], and a delayed pulse may be generated when the counter 404 counts down to 0.

Figure 5:
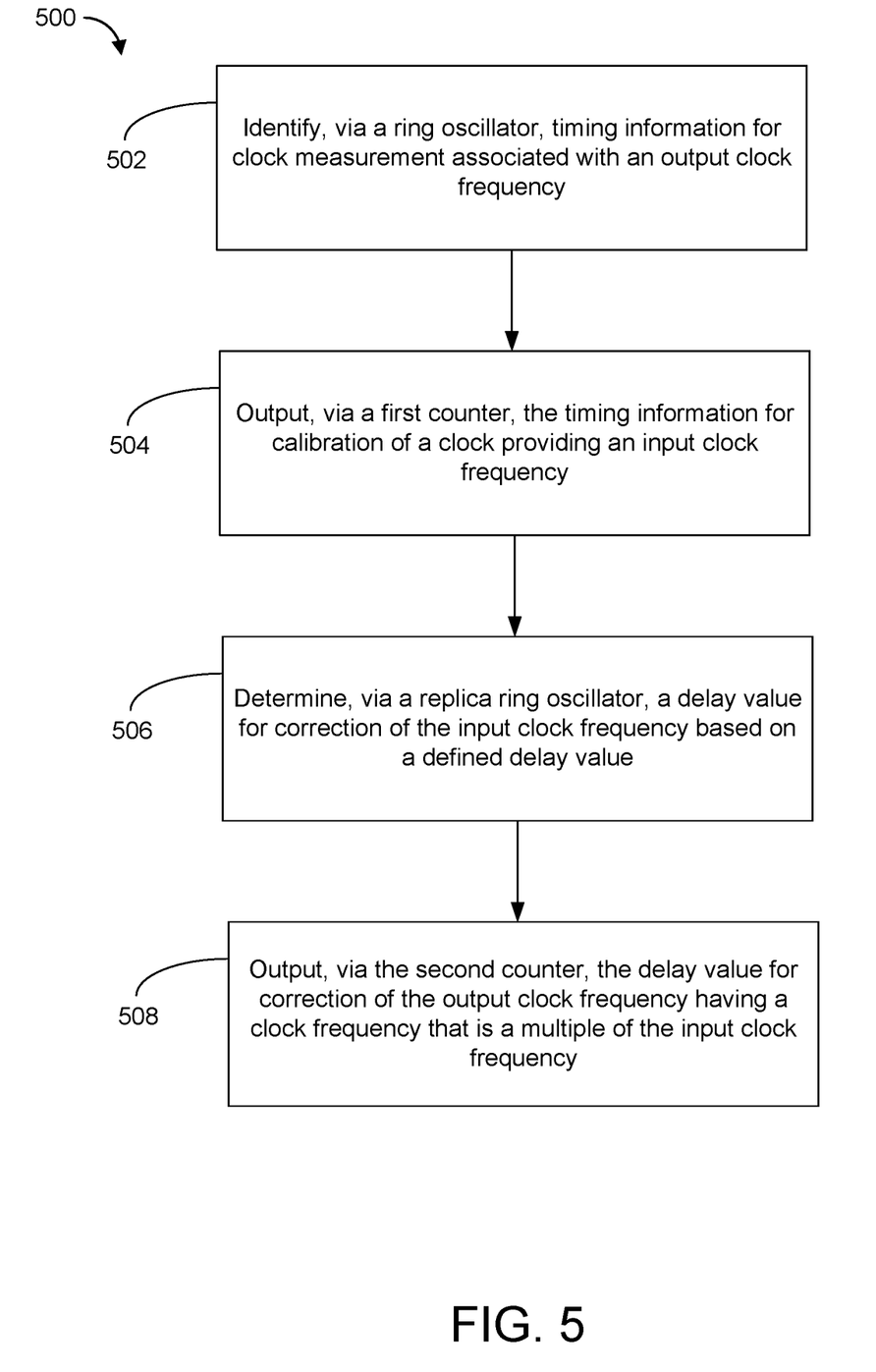
FIG. 5 is a flowchart of an example method of clock cycle correction, according to some embodiments of the present disclosure.

FIG. 5 is a flowchart of an example method 500 of clock cycle correction. The example method 500 may be performed by the clock doubler 100 and/or 200, which may include one or more components as discussed in FIGS. 1-4, and which may operate according to the additional electrical or electronic components as discussed in FIGS. 6-8.

At block 502, method 500 may identify timing information for clock measurement associated with an output clock frequency. For instance, the calibration circuit 130 of the clock doubler 100 or 200 may, via the ring oscillator 110 or 304, identify or otherwise determine timing information such as clock period and clock pulse width for clock measurement associated with an output clock frequency (i.e., of output clock signal 104).

At block 504, method 500 may output the timing information for calibration of a clock providing an input clock frequency. For example, the calibration circuit 130 of the clock doubler 100 or 200 may, via a first counter (i.e., counter 306), output the timing information for calibration of a clock providing an input clock frequency.

At block 506, method 500 may determine a delay value for correction of the input clock frequency based on a defined delay value. For instance, the programmable delay circuit 140 of the clock doubler 100 or 200 may, via a replica ring oscillator 120 or 402, determine or otherwise receive a delay value for correction of the input clock frequency (i.e., of input clock signal 102) based on a defined delay value (i.e., Delay [M−1:0]).

At block 508, method 500 may output the delay value for correction of the output clock frequency having a clock frequency that is a multiple of the input clock frequency. For example, the programmable delay circuit 140 of the clock doubler 100 or 200 may, via a second counter (i.e., counter 404), output the delay value for correction of the output clock frequency (i.e., of output clock signal 104) having a clock frequency that is a multiple (i.e., double) of the input clock frequency.

In some examples, the clock period and clock pulse width may be identified based on a number of ring oscillator clock cycles (i.e., of the ring oscillator 110).

In some examples, the delay value may further be based on the timing information (i.e., clock period and clock pulse width).

In some examples, correction of the output clock frequency (i.e., of the output clock signal 104) may include at least one of correction of a doubled clock cycle-to-cycle variation or a duty cycle of a doubled clock.

In some examples, the replica ring oscillator may be configured to determine a delay value based on a counter value corresponding to zero.

In some examples, the delay circuit includes two replica ring oscillators.

In various embodiments, a controller may be used to control various aspects of operating the clock doubler 100 as described herein. Such a controller may, e.g., be implemented as a data processing system shown in FIG. 8.

The clock doubler 100 may be implemented in various electronic devices and systems. Some examples are shown in FIGS. 6 and 7.

Figure 6:
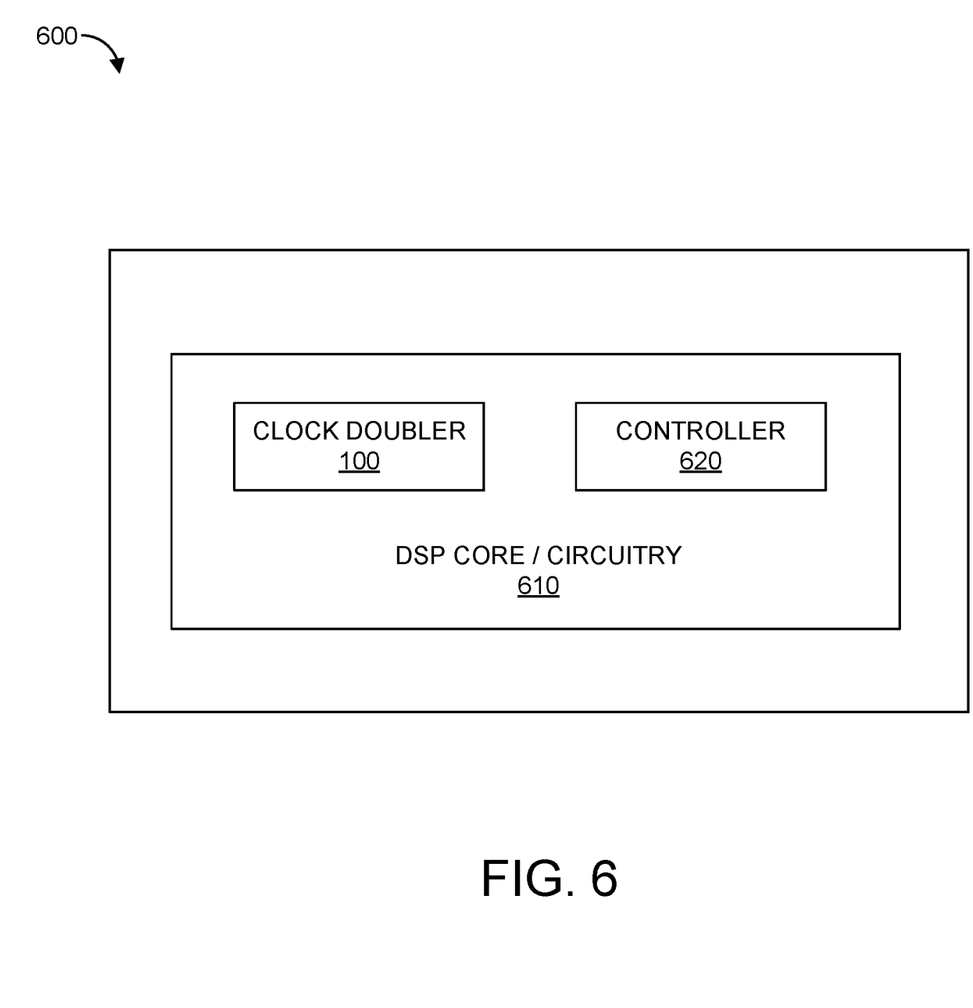
FIG. 6 provides a schematic illustration of an example system in which one or more clock doublers may be implemented, according to some embodiments of the present disclosure.

FIG. 6 provides a schematic illustration of an example system 600 in which one or more clock doublers 100 and 200 may be implemented, according to some embodiments of the present disclosure. In particular, FIG. 6 illustrates that the clock doubler 100 and 200 may be included as a part of, or be communicatively coupled to, a DSP core or a DSP circuitry 610. The system 600 may further include a controller 620, configured to control various aspects of operating the clock doubler 100 and 200 as described herein.

Figure 7:
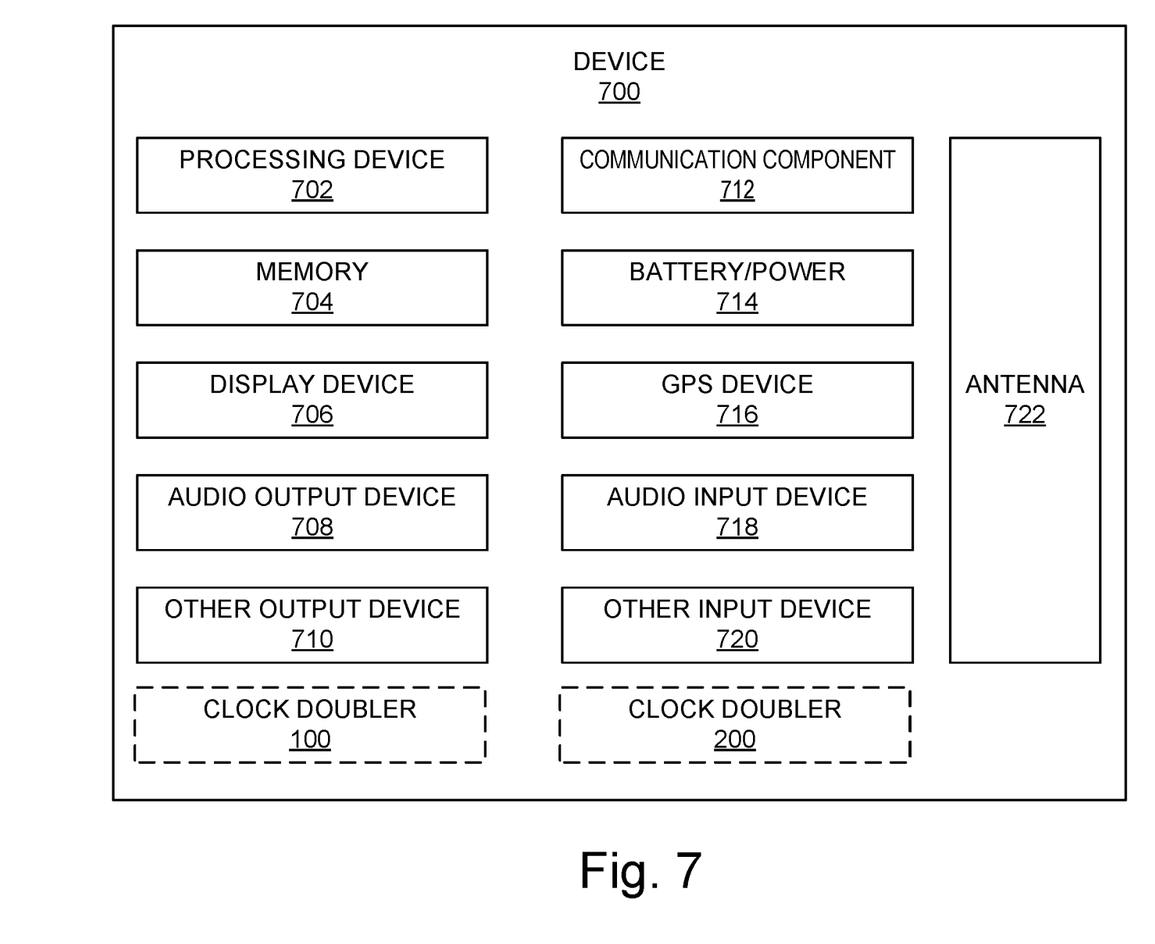
FIG. 7 is a block diagram of an example electrical device that may include one or more clock doublers, according to some embodiments of the present disclosure.

FIG. 7 is a block diagram of an example electrical device 600 that may include one or more clock doublers 100, in accordance with any of the embodiments disclosed herein. For example, any suitable ones of the components of the electrical device 700 may include one or more of the clock doublers 200 disclosed herein. A number of components are illustrated in FIG. 7 as included in the electrical device 700, but any one or more of these components may be omitted or duplicated, as suitable for the application. In some embodiments, some or all of the components included in the electrical device 700 may be attached to one or more motherboards. In some embodiments, some or all of these components are fabricated onto a single system-on-a-chip (SoC).

Additionally, in various embodiments, the electrical device 700 may not include one or more of the components illustrated in FIG. 7, but the electrical device 700 may include interface circuitry for coupling to the one or more components. For example, the electrical device 700 may not include a display device 706, but may include display device interface circuitry (e.g., a connector and driver circuitry) to which a display device 706 may be coupled. In another set of examples, the electrical device 700 may not include an audio input device 718 or an audio output device 708, but may include audio input or output device interface circuitry (e.g., connectors and supporting circuitry) to which an audio input device 718 or audio output device 708 may be coupled.

The electrical device 700 may include a processing device 702 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 702 may include one or more DSPs, application-specific integrated circuits (ASICs), central processing units (CPUs), graphics processing units (GPUs), cryptoprocessors (specialized processors that execute cryptographic algorithms within hardware), server processors, or any other suitable processing devices. The electrical device 700 may include a memory 704, which may itself include one or more memory devices such as volatile memory (e.g., dynamic RAM (DRAM)), nonvolatile memory (e.g., read-only memory (ROM)), flash memory, solid state memory, and/or a hard drive. In some embodiments, the memory 704 may include memory that shares a die with the processing device 702. This memory may be used as cache memory and may include embedded DRAM (eDRAM) or spin transfer torque magnetic RAM (STT-MRAM).

In some embodiments, the electrical device 700 may include a communication chip 712 (e.g., one or more communication chips). For example, the communication chip 712 may be configured for managing wireless communications for the transfer of data to and from the electrical device 700. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 712 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 712 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 712 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 712 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 712 may operate in accordance with other wireless protocols in other embodiments. The electrical device 700 may include an antenna 722 to facilitate wireless communications and/or to receive other wireless communications (such as AM or FM radio transmissions).

In some embodiments, the communication chip 712 may manage wired communications, such as electrical, optical, or any other suitable communication protocols (e.g., the Ethernet). As noted above, the communication chip 712 may include multiple communication chips. For instance, a first communication chip 712 may be dedicated to shorter-range wireless communications such as Wi-Fi or Bluetooth, and a second communication chip 712 may be dedicated to longer-range wireless communications such as global positioning system (GPS), EDGE, GPRS, CDMA, WiMAX, LTE, EV-DO, or others. In some embodiments, a first communication chip 712 may be dedicated to wireless communications, and a second communication chip 712 may be dedicated to wired communications.

The electrical device 700 may include battery/power circuitry 714. The battery/power circuitry 714 may include one or more energy storage devices (e.g., batteries or capacitors) and/or circuitry for coupling components of the electrical device 700 to an energy source separate from the electrical device 700 (e.g., AC line power).

The electrical device 700 may include a display device 706 (or corresponding interface circuitry, as discussed above). The display device 706 may include any visual indicators, such as a heads-up display, a computer monitor, a projector, a touchscreen display, a liquid crystal display (LCD), a light-emitting diode display, or a flat panel display.

The electrical device 700 may include an audio output device 708 (or corresponding interface circuitry, as discussed above). The audio output device 708 may include any device that generates an audible indicator, such as speakers, headsets, or earbuds.

The electrical device 700 may include an audio input device 718 (or corresponding interface circuitry, as discussed above). The audio input device 718 may include any device that generates a signal representative of a sound, such as microphones, microphone arrays, or digital instruments (e.g., instruments having a musical instrument digital interface (MIDI) output).

The electrical device 2100 may include a GPS device 716 (or corresponding interface circuitry, as discussed above). The GPS device 716 may be in communication with a satellite-based system and may receive a location of the electrical device 700, as known in the art.

The electrical device 700 may include another output device 710 (or corresponding interface circuitry, as discussed above). Examples of the other output device 710 may include an audio codec, a video codec, a printer, a wired or wireless transmitter for providing information to other devices, or an additional storage device.

The electrical device 700 may include another input device 720 (or corresponding interface circuitry, as discussed above). Examples of the other input device 720 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 700 may have any desired form factor, such as a handheld or mobile electrical device (e.g., a cell phone, a smart phone, a mobile internet device, a music player, a tablet computer, a laptop computer, a netbook computer, an ultra book computer, a personal digital assistant (PDA), an ultra-mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 700 may be any other electronic device that processes data.

Figure 8:
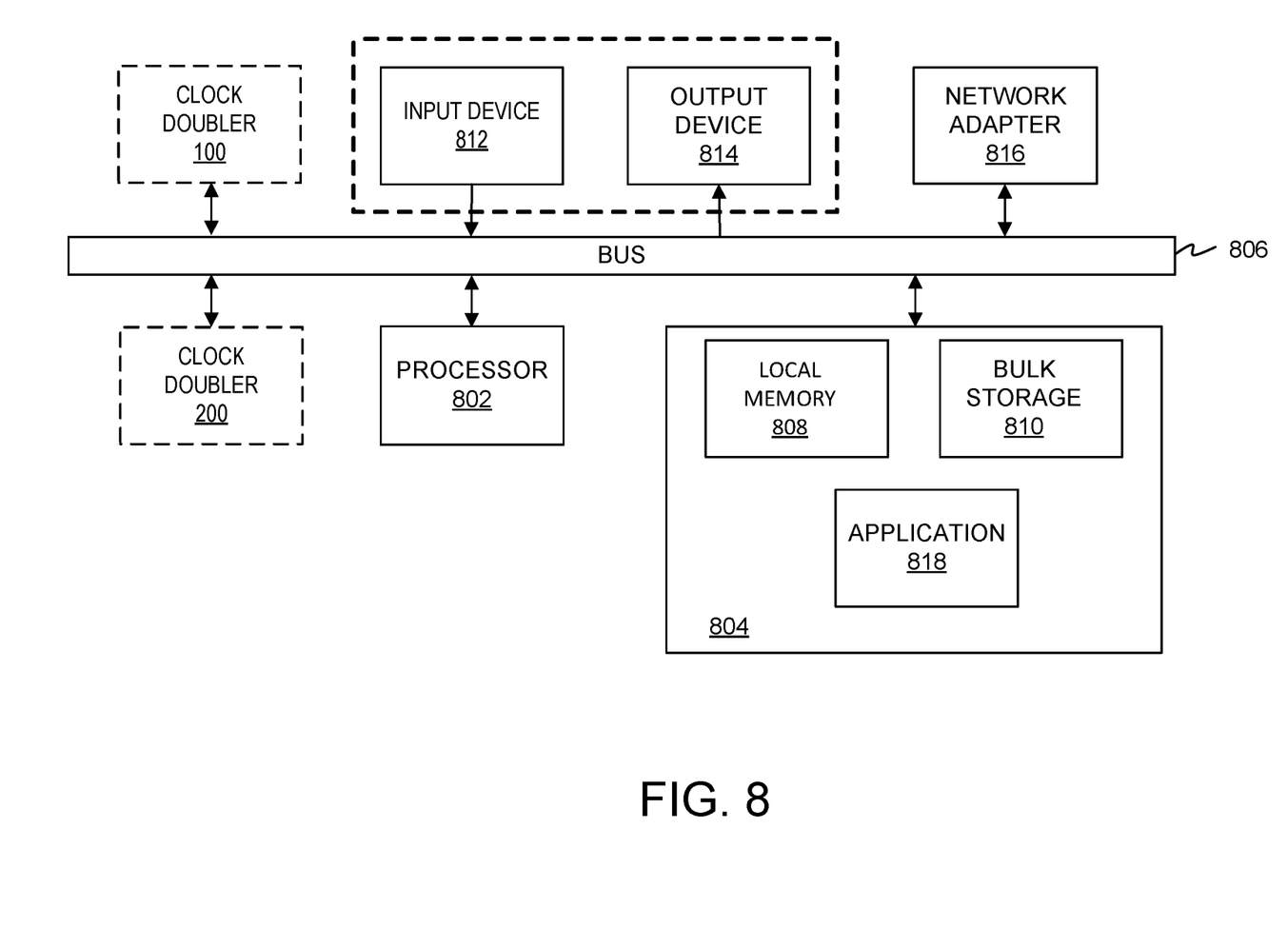
FIG. 8 provides a block diagram illustrating an example data processing system that may be configured to control operation of one or more clock doublers, according to some embodiments of the present disclosure.

FIG. 8 provides a block diagram illustrating an example data processing system 800 that may be configured to control operation of one or more clock doublers 100, according to some embodiments of the present disclosure. For example, the data processing system 800 may be configured to implement or control portions of the clock doubler 100, the clock doubler 200, or any further embodiments of the clock doublers described herein. In another example, the data processing system 800 may be configured to implement at least portions of the controller 520 or any other controller configured to control various aspects of operating the clock doublers as described herein.

As shown in FIG. 8, the data processing system 800 may include at least one processor 802, e.g., a hardware processor 802, coupled to memory elements 804 through a system bus 806. As such, the data processing system may store program code within memory elements 804. Further, the processor 802 may execute the program code accessed from the memory elements 804 via a system bus 806. In one aspect, the data processing system may be implemented as a computer that is suitable for storing and/or executing program code. It should be appreciated, however, that the data processing system 800 may be implemented in the form of any system including a processor and a memory that is capable of performing the functions described within this disclosure.

In some embodiments, the processor 802 can execute software or an algorithm to perform the activities as discussed in the present disclosure, in particular activities related to clock doublers as described herein. The processor 802 may include any combination of hardware, software, or firmware providing programmable logic, including by way of non-limiting example a microprocessor, a DSP, a field-programmable gate array (FPGA), a programmable logic array (PLA), an application specific IC (ASIC), or a virtual machine processor. The processor 802 may be communicatively coupled to the memory element 804, for example in a direct-memory access (DMA) configuration, so that the processor 802 may read from or write to the memory elements 804.

In general, the memory elements 804 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 2200 could be provided in any database, register, control list, cache, or storage structure, all of which can be referenced at any suitable timeframe. Any such storage options may be included within the broad term "memory" as used herein.

Similarly, any of the potential processing elements, modules, and machines described herein should be construed as being encompassed within the broad term "processor." Each of the elements shown in the present figures, e.g., any elements of the clock doubler 100, shown in FIGS. 1-4, can also include suitable interfaces for receiving, transmitting, and/or otherwise communicating data or information in a network environment so that they can communicate with, e.g., the data processing system 800.

In certain example implementations, mechanisms for implementing one or more clock doublers as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as the memory elements 804 shown in FIG. 8, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as the processor 802 shown in FIG. 8, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 804 may include one or more physical memory devices such as, for example, local memory 808 and one or more bulk storage devices 810. The local memory may refer to RAM or other non-persistent memory device(s) generally used during actual execution of the program code. A bulk storage device may be implemented as a hard drive or other persistent data storage device. The processing system 800 may also include one or more cache memories (not shown) that provide temporary storage of at least some program code in order to reduce the number of times program code must be retrieved from the bulk storage device 810 during execution.

As shown in FIG. 8, the memory elements 804 may store an application 818. In various embodiments, the application 818 may be stored in the local memory 808, the one or more bulk storage devices 810, or apart from the local memory and the bulk storage devices. It should be appreciated that the data processing system 800 may further execute an operating system (not shown in FIG. 8) that can facilitate execution of the application 818. The application 818, being implemented in the form of executable program code, can be executed by the data processing system 800, e.g., by the processor 802. Responsive to executing the application, the data processing system 800 may be configured to perform one or more operations or method steps described herein.

Input/output (I/O) devices depicted as an input device 812 and an output device 814, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 814 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 814. Input and/or output devices 812, 814 may be coupled to the data processing system either directly or through intervening I/O controllers.

In an embodiment, the input and the output devices may be implemented as a combined input/output device (illustrated in FIG. 8 with a dashed line surrounding the input device 812 and the output device 814). An example of such a combined device is a touch sensitive display, also sometimes referred to as a "touch screen display" or simply "touch screen". In such an embodiment, input to the device may be provided by a movement of a physical object, such as a stylus or a finger of a user, on or near the touch screen display.

A network adapter 816 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 800, and a data transmitter for transmitting data from the data processing system 800 to said systems, devices and/or networks. Modems, cable modems, and Ethernet cards are examples of different types of network adapter that may be used with the data processing system 800.

The following paragraphs provide various examples of the embodiments disclosed herein.

Example 1 provides a clock doubler configured to use a synchronously triggered free-running ring oscillator as a time reference with a counter for clock measurement.

Example 2 provides a clock doubler configured to use synchronously triggered free-running replica ring oscillators with a counter for long programmable delay generation.

Example 3 provides a clock doubler configured to use background clock calibration and substantially glitch-free clock correction techniques.

Example 4 provides an electronic device that includes a clock doubler according to any of the preceding examples and/or according to any embodiments of the present disclosure.

Example 5 provides the electronic device according to example 4, where the electronic device is a digital signal processing core or a digital signal processing circuitry.

Example 6 provides the electronic device according to examples 4 or 5, where the clock doubler is to clock operation of one or more ADCs and/or one or more DACs.

Example 7 provides a method for operating a clock doubler according to any embodiments described herein.

Example 8 provides a non-transitory computer-readable storage medium including instructions for execution which, when executed by a processor, are operable to perform operations of the method according to example 7.

While embodiments of the present disclosure were described above with references to exemplary implementations as shown in FIGS. 1-8, a person skilled in the art will realize that the various teachings described above are applicable to a large variety of other implementations.

In the discussions of the embodiments above, components of a system, such as counters, logic elements (e.g., XOR gates), and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to implementing one or more clock doublers.

Parts of various systems for implementing one or more clock doublers as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In some embodiments, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In some embodiments, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

All of the specifications, dimensions, and relationships outlined herein (e.g., the number of components of the clock doublers, or portions thereof, shown in the present drawings, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the present drawings may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the present figures and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Furthermore, functions related to implementing one or more clock doublers as proposed herein illustrate only some of the possible functions that may be executed by, or within, system illustrated in the present figures. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The invention claimed is:

1. A clock doubler, comprising:
a calibration circuit including a ring oscillator and a first counter, wherein
the ring oscillator is configured to identify timing information for clock measurement associated with an output clock frequency; and
the first counter is configured to output the timing information for calibration of a clock providing an input clock frequency;
a delay circuit including a replica ring oscillator and a second counter, wherein the replica ring oscillator is configured to determine a delay value for correction of the input clock frequency based on a defined delay value, wherein the replica ring oscillator is configured to determine the delay value based on a counter value corresponding to a defined value; and the second counter is configured to output the delay value for correction of the output clock frequency having a clock frequency that is a multiple of the input clock frequency.

2. The clock doubler of claim 1, wherein the timing information includes a clock period and clock pulse width.

3. The clock doubler of claim 2, wherein the clock period and clock pulse width are identified based on a number of ring oscillator clock cycles.

4. The clock doubler of claim 1, wherein the delay value is further based on the timing information.

5. The clock doubler of claim 1, wherein correction of the output clock frequency includes at least one of correction of a doubled clock cycle-to-cycle variation or a duty cycle of a doubled clock.

6. The clock doubler of claim 1, wherein the defined value corresponds to zero.

7. The clock doubler of claim 1, wherein the delay circuit includes two replica ring oscillators.

8. A method of clock cycle correction, comprising:
identifying, via a ring oscillator, timing information for clock measurement associated with an output clock frequency;
outputting, via a first counter, the timing information for calibration of a clock providing an input clock frequency;
determining, via a replica ring oscillator, a delay value for correction of the input clock frequency based on a defined delay value, wherein the replica ring oscillator is configured to determine the delay value based on a counter value corresponding to zero; and
outputting, via the second counter, the delay value for correction of the output clock frequency having a clock frequency that is a multiple of the input clock frequency.

9. The method of claim 8, wherein the timing information includes a clock period and clock pulse width.

10. The method of claim 9, wherein the clock period and clock pulse width are identified based on a number of ring oscillator clock cycles.

11. The method of claim 8, wherein the delay value is further based on the timing information.

12. The method of claim 8, wherein correction of the output clock frequency includes at least one of correction of a doubled clock cycle-to-cycle variation or a duty cycle of a doubled clock.

13. The method of claim 8, wherein the defined value corresponds to zero.

14. The method of claim 8, wherein the delay circuit includes two replica ring oscillators.

15. A clock doubler, comprising:
means for identifying timing information for clock measurement associated with an output clock frequency; and
means for outputting the timing information for calibration of a clock providing an input clock frequency;
means for determining a delay value for correction of the input clock frequency based on a defined delay value, wherein the delay value is determined based on counter value corresponding to a defined value; and
means for outputting the delay value for correction of the output clock frequency having a clock frequency that is a multiple of the input clock frequency.

16. The clock doubler of claim 15, wherein the timing information includes a clock period and clock pulse width.

17. The clock doubler of claim 16, wherein the clock period and clock pulse width are identified based on a number of ring oscillator clock cycles.

18. The clock doubler of claim 16, wherein the delay value is further based on the timing information.

19. The clock doubler of claim 16, wherein correction of the output clock frequency includes at least one of correction of a doubled clock cycle-to-cycle variation or a duty cycle of a doubled clock.

20. The clock doubler of claim 16, wherein the defined value corresponds to zero.

* * * * *